United States Patent [19]

Batzold et al.

[11] 4,435,267
[45] Mar. 6, 1984

[54] GAS PERCOLATION BARRIER FOR GAS FED ELECTRODE

[75] Inventors: John S. Batzold, Union; Judith C. Savas, Clark, both of N.J.

[73] Assignee: Exxon Research and Engineering Co., Florham Park, N.J.

[21] Appl. No.: 433,753

[22] Filed: Oct. 8, 1982

[51] Int. Cl.³ .............. C25B 11/03; C25B 11/04; C25B 13/08; H01M 4/86
[52] U.S. Cl. .............. 204/284; 204/265; 204/290 R; 204/286; 429/42
[58] Field of Search .............. 204/263–266, 204/284, 290 R, 294, 291, 277, 256, 258, 270, 286; 429/42

[56] References Cited

U.S. PATENT DOCUMENTS

| | | | |
|---|---|---|---|
| 3,935,027 | 1/1976 | Warde et al. | 204/291 |
| 4,287,032 | 9/1981 | Pellegri | 204/294 X |
| 4,299,682 | 11/1981 | Oda et al. | 204/265 |
| 4,332,662 | 6/1982 | Pouli et al. | 204/266 X |
| 4,349,428 | 9/1982 | Lu et al. | 204/294 |

FOREIGN PATENT DOCUMENTS

| | | | |
|---|---|---|---|
| 55-69281 | 5/1980 | Japan | 204/290 R |
| 445947 | 12/1974 | U.S.S.R. | 204/290 R |

*Primary Examiner*—Donald R. Valentine
*Attorney, Agent, or Firm*—Joseph J. Dvorak

[57] ABSTRACT

A porous gas fed electrode adapted to operate in a large capacity cell with a stable three phase interface in the electrode thereby avoiding the problems of gas percolation can be readily achieved in a simple and inexpensive manner by applying a porous hydrophilic layer on the surface of the electrode which is in contact with the aqueous electrolyte. Due to the high capillary pressure exhibited by liquids in hydrophilic pores, very high gas pressures are required to force the gas through the structure and the loss of gas into the electrolyte is thereby eliminated. In addition, a gas pressure in the gas compartment of the electrochemical cell employing such an electrode can be raised to balance the electrolyte pressure at the bottom of the electrode thereby effectively preventing electrolyte seepage into the gas compartment. Thus, in its simplest sense, the present invention comprises a porous gas fed electrode structure having a hydrophilic layer on the surface of the electrode which contacts liquid electrolyte.

5 Claims, 4 Drawing Figures

GAS PERCOLATION BARRIER FOR GAS FED ELECTRODE

FIELD OF THE INVENTION

This invention relates to an electrode for use in electrolytic devices. More particularly, the present invention is directed toward an improved gas fed porous electrode structure adapted to function vertically in a relatively deep supply of contacting aqueous electrolyte which exerts substantial outwardly increasing hydraulic pressure.

BACKGROUND OF THE INVENTION

The use of gas fed electrodes in various electrolytic processes is well-known in the art. The structure and use of such electrodes are demonstrated in the following U.S. patents among others: U.S. Pat. Nos. 4,229,490; 4,278,525; 4,213,833; 4,301,218.

Generally, such porous electrodes are used in systems capable of generating electricity, such as in fuel cells, and in electrochemical processes in which the electrode functions as a depolarized cathode, such as in chloralkali cells. Also of growing interest is the use of fuel-fed porous catalytic electrode structures in electrowinning metals such as copper from aqueous acidic solutions. In this regard see U.S. Pat. Nos. 3,103,473; 3,103,474; and 3,793,165 as examples of such processes.

In processes employing gas fed electrodes, the electrode typically is mounted in a vertical position in a cell and gas is fed to one side of the electrode while the other side is in contact with an aqueous electrolyte. The electrochemical reaction generally is believed to take place at the interface of the liquid electrolyte, the gas phase and the solid catalyst of the electrode. Since the three phase interface area is believed to be important in processes employing gas fed electrodes, means have been developed for maintaining the three phase interface within the passageways of the porous electrode bodies. One technique that has been employed is to utilize a hydrophobic material on the interior pore sufaces, particularly on the gas side of the electrode structure. The hydrophobic nature of this surface tends to prevent the electrolyte from wetting the structures and penetrating entirely through the electrode.

Another technique that is employed to maintain the three phase interface is to very carefully balance the gas pressure applied and the capillary pressure generated by the electrolyte solution. Generally, this is achieved by means of a porous electrode body which has a very narrow distribution of pore sizes.

In yet another technique, it is known to use a double porosity structure for the electrode body, such that the layer designed to be in contact with the electrolyte has significantly smaller pores than those pores which are in the layer adapted to be on the gas side of the structure. In this way it is possible to apply a gas pressure through the larger pore area that is greater than the median electolyte capillary pressure in the large pores, but smaller than that in the small pore layer so as to maintain the three phase contact sector within the passageways.

Unfortunately the foregoing techniques are not particularly satisfactory when the overall size of the gas fed electrode is designed to function vertically in large scale cells having relatively deep supply of electrolytes such as cells employed in electrowinning of metals from aqueous acidic solutions since problems arise in maintaining the necessary three phase interface inside the electrode over its entire depth. Basically, the hydraulic pressure of the electrolyte against the electrode increases with depth while the gas pressure normally remains constant. Consequently, there is a tendency for gas to percolate through the top of the electrode into the electrolyte and for liquid to penetrate into the gas compartment at the bottom. This tendency becomes more and more pronounced as the electrode size increases. As a result there is a net loss of gaseous reactant and the electrochemical functioning of a portion of the electrode is impaired by the penetration of the liquid into the electrode and gas compartment. Accordingly, there remains a need for an improved porous gas fed electrode structure, particularly for large scale applications, which will avoid the considerable disadvantage and difficulty of preventing gas percolation through such porous electrode structures.

SUMMARY OF THE INVENTION

It has now been found that porous gas fed electrodes adapted to operate in a large capacity cell with a stable three phase interface in the electrode thereby avoiding the problems of gas percolation can be readily achieved in a simple and inexpensive manner by applying a porous hydrophilic layer on the surface of the electrode which is in contact with the aqueous electrolyte. Due to the high capillary pressure exhibited by liquids in hyrophilic pores, very high gas pressures are required to force the gas through the structure and the loss of gas into the electrolyte is thereby eliminated. In addition, a gas pressure in the gas compartment of the electrochemical cell employing such an electrode can be raised to balance the electrolyte pressure at the bottom of the electrode thereby effectively preventing electrolyte seepage into the gas compartment. Thus, in its simplest sense, the present invention comprises a porous gas fed electrode structure having a hydrophilic layer on the surface of the electrode which contacts liquid electrolyte.

DESCRIPTION OF THE INVENTION

Figure 1:
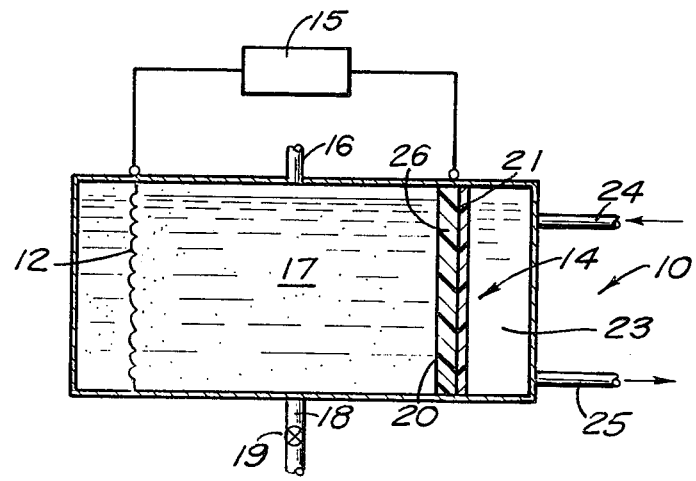
FIG. 1 is a schematic, simplified, exaggerated elevational view of a cross-section of a electrochemical cell employing a porous gas fed electrode in accordance with the present invention.

With initial reference to FIG. 1 of the drawings, there is shown an electrolytic cell identified generally by the reference numeral 10. In a particularly preferred embodiment the cell 10 will be one used for the electrowinning of a metal, such as zinc or copper, from an aqueous acidic electrolyte solution containing the metal. As can be seen, the cell 10 is provided with a cathode 12 and an anode 14 connected to a power supply 15. An inlet 16 is provided for introducing an electrolyte 17 between the anode 14 and cathode 12. A line 18 with a valve 19 is provided for removing or draining electrolyte from the cell. The anode 14 is mounted vertically within the cell and has a first surface 20 in contact with electrolyte 17. The second and opposite surface 21 of anode 14 is in contact with a fuel such as hydrogen which is introduced into the plenum 23 of cell 10 via line 24. Plenum 23 can be pressurized and if so desired, the gas can be flowed through plenum 23 via line 24 and line 25.

Figure 2:
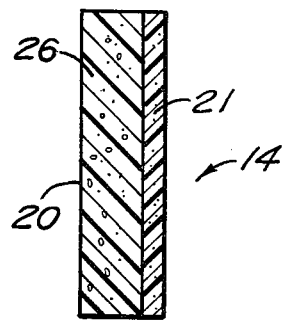
FIG. 2 is an end view of an electrode structure in accordance with the present invention.

Referring now to FIG. 2, it can be seen that the porous fed electrode structure of the present invention includes an electroconductive hydrophobic porous substrate 26 having deposited upon one surface thereof a thin porous layer 21 of hydrophilic material.

Any hydrophobic material, such as hyrophobic polymers that are capable of being formed into porous structures by sintering and the like, may be employed in forming the porous structure 26. In general, it is preferred to use polymers and copolymers of vinylchloride, polyethylene, polybutylene, polypropylene, polytrichlorofluoroethylene and polytetrafluoroethylene in forming porous structure 26. Indeed, in the practice of the present invention, it is particularly preferred to use polytetrafluoroethylene which is commercially available as a colloidal dispersion in water. These colloidal dispersions are ideally adapted to being intimately mixed with finely divided electrically conductive substances such as carbon to produce a mixture that can be sintered so as to constitute an electroconductive porous structure. Suitable finely divided electrically conductive substances include carbon, silicon carbide and tungsten carbide. In the practice of the present invention, it is particularly preferred to use finely divided carbon.

In general, a catalyst also will be incorporated in the porous electrode structure. If carbon powder is used to provide electroconductivity of the structure the catalyst, especially precious metal catalysts, may be carried on the carbon powder. Methods for incorporating catalysts in porous electrode structures are well-known in the art.

The hydrophilic layer 21 of electrode 14 of the present invention typically is fabricated from hydrophilic materials such as asbestos, alumina and silica gel. Preferably asbestos is employed. This hydrophilic material generally is bound to the porous electrode body portion 26 by the same polymeric material used in fabricating portion 26; however, it is important that the polymeric material be used in an amount sufficient to provide enough binder to give mechanical strength to the hyrophilic material in binding it to the electrode structure 26 without reaching levels that would markedly reduce the hydrophilic properties of the layer. Using polytetrafluoroethylene as an example generally from about 30% to 50% by weight of polytetrafluoroethylene is normally used in the fabrication of the porous substrate 26 whereas only from about 15% to 25%, and preferably 20% by weight of polytetrafluorethylene is added to the hyrophilic material applied to the surface layer 21 of the body portion 26 in electrode 14.

In general, the hydrophilic layer 21 will range in thickness from about 50 to 500 microns, and preferably from 100 to 200 microns.

Figure 3:
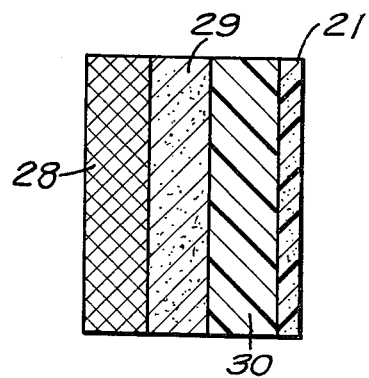
FIG. 3 is a view in fanciful, enlarged, broken away, cross-sectional elevation of the arrangement of elements used in fabricating a preferred porous electrode of the present invention.

Referring now to FIG. 3, a particularly preferred porous electrode is fabricated by placing a metal mesh current collector 28 in contact with a carbon cloth 29. The metal mesh current collector employed may be any one of well-known materials employed for this purpose in porous electrode structures, such as expanded titanium mesh, stainless steel mesh, and lead mesh. The carbon cloth 29 used is a woven carbon fabric having in the range of about 25 to 40 yarns per inch in the warp and woof and a thickness of about 20 to 30 mils. One such suitable woven carbon fabric is Panex PWB6 sold by Stackpole Fibers Co., Lowell, Mass.

A layer of hydrophobic polymer containing a carbon supported metal catalyst is placed in contact with carbon cloth 29. This assembly is cold pressed and then hot pressed at temperatures in the range of about 325° C. to about 365° C. to sinter the polymer and thereby provide a porous electrode structure. Then the electrode structure 26 of FIG. 2, i.e., layers 28, 29 and 30 of FIG. 3 which have been bonded and sintered to each other, are provided with the hydrophilic surface layer 21. In practice, hydrophilic surface layer 21 is prepared by applying a dry sheet of asbestos against the face of the electrode in a horizontal orientation. A polytetrafluoroethylene emulsion, for example an emulsion containing 40% by weight of polytetrafluoroethylene is diluted further with water to give a final volume which will saturate the asbestos. In general, from about 5 to about 20 parts of water and preferably 10 parts of water per part of emulsion is used. This diluted emulsion is applied, for example by spraying on the asbestos layer and thereafter the water is evaporated from the emulsion by heating the entire assembly to about 80° C. in air. After drying, the composite structure is heat treated to sinter the polytetrafluoroethylene for example by heating to 325° C. to 365° C. for 0.5 to 12 minutes. This procedure gives the hydrophilic layer the necessary strength and bonds it securely to the electrode structure.

In an alternate and preferred method after cold pressing the mesh 28, carbon cloth 29 and hydrophobic polymer layer 30, the hydrophilic asbestos sheet can be placed in contact with the assembly, treated with the polymer emulsion, and dried. Then the entire assembly can be sintered by heating for example at 325° C. to 365° C. for 0.5 to 10 minutes. This avoids the step of sintering the assembled layers 28, 29 and 30 after cold pressing.

As will be readily appreciated, when other hydrophobic materials are employed, different ranges in temperature in fabricating the electrode structure of this invention may be required to effectuate the necessary sintering. So too when other hydrophilic materials are used in fabricating the structure of the present invention, variations in formulations, temperatures and processing conditions may be necessary. These variations, of course, are well within the purview of workers in the art.

In any event, the electrodes made in accordance with the present invention are superior to prior art electrodes in that they can withstand much higher hydrostatic head pressure without failure as a result of flooding by a liquid electrolyte and without gas percolation. Indeed, in tests carried out with conventional porous gas fed electrodes ranging in size from about 12 inches by 12 inches, hydrogen percolation was observed to occur over the top 2 inches of the electrode and liquid buildup was observed in the gas compartment of cells soon after the experiment had been started. In contrast thereto, electrodes according to the present invention operated without flooding or gas percolation.

The following examples are submitted for the purpose of illustration only and are not deemed to be a limitation upon the scope of the invention as set forth in the appended claims.

EXAMPLE 1

A sample of a commercially available electrode was tested by mounting the electrode vertically in an electrochemical cell. One side of the porous electrode was in contact with an aqueous electrolyte in which was immersed a counter electrode and a reference electrode. The opposite side of the porous electrode was in contact with hydrogen supplied to a gas plenum. The outlet line from the gas plenum was equipped with a needle valve so that the hydrogen fed to the porous electrode could be pressurized. Also provided in the outlet line from the gas plenum between the cell and the needle valve was a water filled manometer. The hydrogen pressure was increased by means of the needle valve and the pressure monitored by observing the difference in the heights of water in the manometer. Indeed, hydrogen loss by bubbling into the electrolyte was observed when the hydrogen pressure rose to only about 2 cm of water.

During the foregoing test, voltage and current characteristics of the electrode were also measured.

EXAMPLE 2

The procedure of Example 1 was followed. However, the electrode structure was a commercially available electrode to which was provided a hydrophilic surface layer in accordance with the present invention. Thus, the commercially available electrode had placed on it a dry sheet of asbestos sold under the name Quinterra Type 1 by Quin-T Corp., Tilton, N.H.

Figure 4:
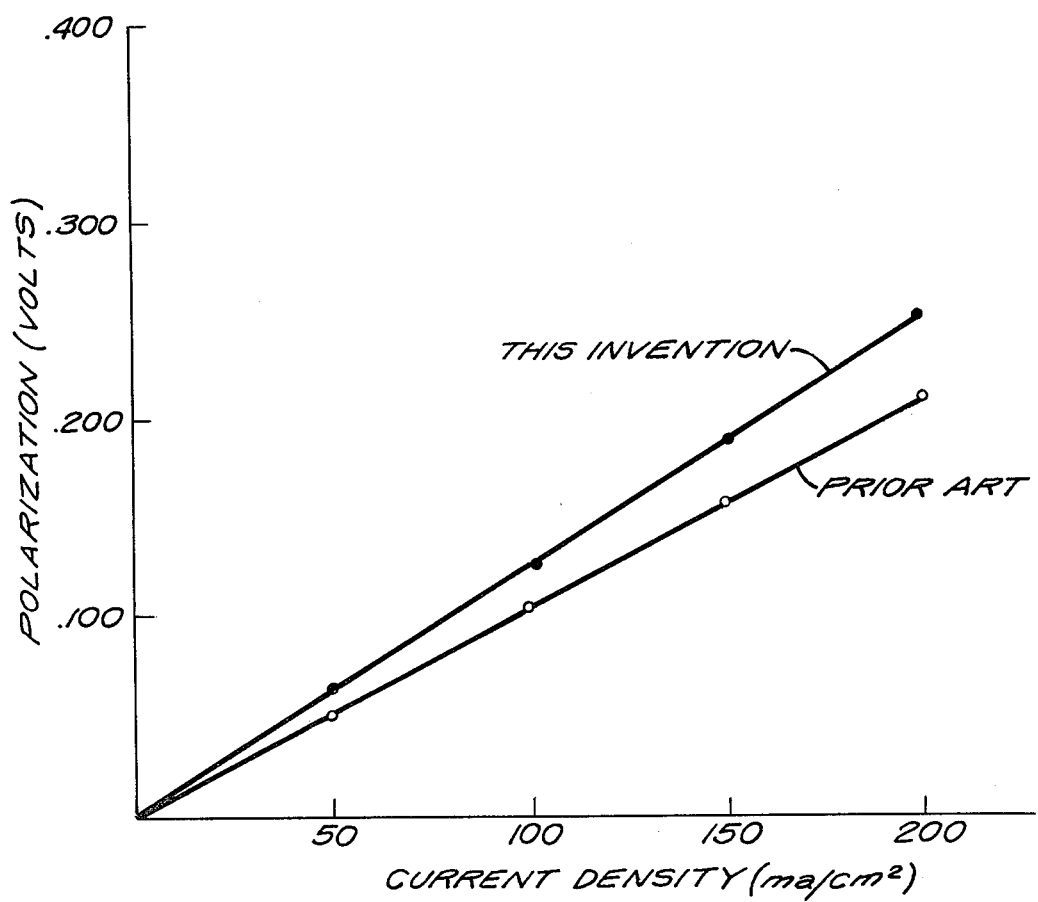
FIG. 4 is a graph comparing the hydrogen activity of an electrode of this invention with an electrode of the prior art.

A polytetrafluoroethylene emulsion, sold under the tradename Teflon 20K by DuPont, Wilmington, Del. was diluted with 10 parts water. A volume of 0.33 cc of this dilute emulsion was used to wet the asbestos while the assembly was in a horizontal position. The wetted assembly was dried in air at 80° C. and thereafter heated in air for 10 minutes at 340° C. to sinter the polytetrafluoroethylene and bond the asbestos to the catalyzed carbon cloth layer of the commercially available porous electrode. The electrode was placed in the cell with the hydrophilic layer in contact with the electrolyte and the test of Example 1 was repeated. No hydrogen leakage was observed even at differential hydrogen pressures across the electrode greater than 50 centimeters of water. The performance of the electrode structure of the present invention is compared with the commercially available electrode in FIG. 4. As can be seen in FIG. 4, only a small voltage loss of about 20 millivolts was suffered at a current density of about 100 milliamps per square centimeter in employing the electrode of the present invention. This penalty apparently is due to the slightly high ionic resistance in the electrolyte introduced by the hydrophilic layer. This loss of performance, however, is greatly outweighed by the significant improvement in avoidance of flooding of the electrode and loss of gas by percolation through the top of the electrode structure.

What is claimed is:

1. A gas fed porous electrode adapted for vertical use in an electrolytic cell of the type wherein a first side of said electrode is positioned to be in contact with aqueous electrolyte and the second and opposite side is positioned to face a source of gas being fed to said electrode, said electrode comprising:

a porous electroconductive body of hydrophobic polymeric material selected from the group consisting of polymers and copolymers and vinylchloride, polyethylene, polybutylene, polypropylene, polytrifluorethylene, and polytetrafluoroethylene, said body including a carbon cloth support for said hydrophobic polymeric material and an electrochemical catalyst, said porous electroconductive body having on the surface in contact with the electrolyte a thin porous hydrophilic layer selected from the group consisting of asbestos, alumina and silica gel, said hydrophilic material being bonded to said hydrophobic polymer with a hydrophobic polymer in an amount sufficient to bond the hydrophilic material while maintaining the hydrophilic nature of such material.

2. The electrode of claim 1 wherein said hydrophilic layer ranges in thickness from about 50 to about 500 microns.

3. The electrode of claim 2 wherein said hydrophilic layer ranges in thickness from about 100 to about 200 microns.

4. The electrode of claim 3 wherein said hydrophilic material is asbestos.

5. The electrode of claim 4 wherein said hydrophobic polymer is polytetrafluoroethylene and from 15 to 25 weight percent of polytetrafluoroethylene is added to said hydrophilic material to bond said hydrophilic material to said porous electroconductive body.

* * * * *